(12) United States Patent
Ayyapureddi

(10) Patent No.: US 12,488,830 B2
(45) Date of Patent: Dec. 2, 2025

(54) OUTPUT TIMING FOR CHANNEL LOOPBACK OF A MEMORY DEVICE

(71) Applicant: Micron Technology, Inc., Boise, ID (US)

(72) Inventor: Sujeet V. Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 163 days.

(21) Appl. No.: 18/117,829

(22) Filed: Mar. 6, 2023

(65) Prior Publication Data

US 2023/0326514 A1 Oct. 12, 2023

Related U.S. Application Data

(60) Provisional application No. 63/328,578, filed on Apr. 7, 2022.

(51) Int. Cl.
*G11C 29/12* (2006.01)
*G11C 11/4076* (2006.01)
*G11C 11/22* (2006.01)

(52) U.S. Cl.
CPC ........ *G11C 11/4076* (2013.01); *G11C 11/221* (2013.01); *G11C 11/2293* (2013.01)

(58) Field of Classification Search
CPC ............. G11C 11/4076; G11C 11/221; G11C 11/2293
See application file for complete search history.

(56) References Cited

U.S. PATENT DOCUMENTS

| 11,710,534 | B1 * | 7/2023 | Mohr | G11C 29/38 |
| | | | | 714/721 |
| 2012/0250433 | A1 * | 10/2012 | Jeon | G06F 3/0614 |
| | | | | 365/230.08 |
| 2018/0350411 | A1 * | 12/2018 | Ware | G11C 7/04 |
| 2019/0042519 | A1 * | 2/2019 | Jue | G06F 3/0659 |
| 2020/0349991 | A1 * | 11/2020 | Ware | G11C 29/028 |

\* cited by examiner

*Primary Examiner* — Min Huang
(74) *Attorney, Agent, or Firm* — Holland & Hart LLP

(57) ABSTRACT

Methods, systems, and devices for output timing for channel loopback of a memory device are described. For example, a memory device may be configured to receive a first signal indicative of a logic value in accordance with a rising edge of a first clock signal, and to output a second signal indicative of the logic value in accordance with a falling edge of a second clock signal. In various examples, the second clock signal may be generated by the memory device based on receiving the first clock signal from the host device, or the first clock signal and the second clock signal may be the same clock signal, which may be generated at the memory device based on a different clock signal received from the host device. In some examples, the timing of the second signal may be different than timing implemented for other signaling from the memory device.

20 Claims, 9 Drawing Sheets

OUTPUT TIMING FOR CHANNEL LOOPBACK OF A MEMORY DEVICE

CROSS REFERENCE

The present Application for Patent claims the benefit of U.S. Provisional Patent Application No. 63/328,578 by Ayyapureddi, entitled "OUTPUT TIMING FOR CHANNEL LOOPBACK OF A MEMORY DEVICE," filed Apr. 7, 2022, which is assigned to the assignee hereof, and which is expressly incorporated by reference herein.

FIELD OF TECHNOLOGY

The following relates to one or more systems for memory, including output timing for channel loopback of a memory device.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not- or (NOR) and not- and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
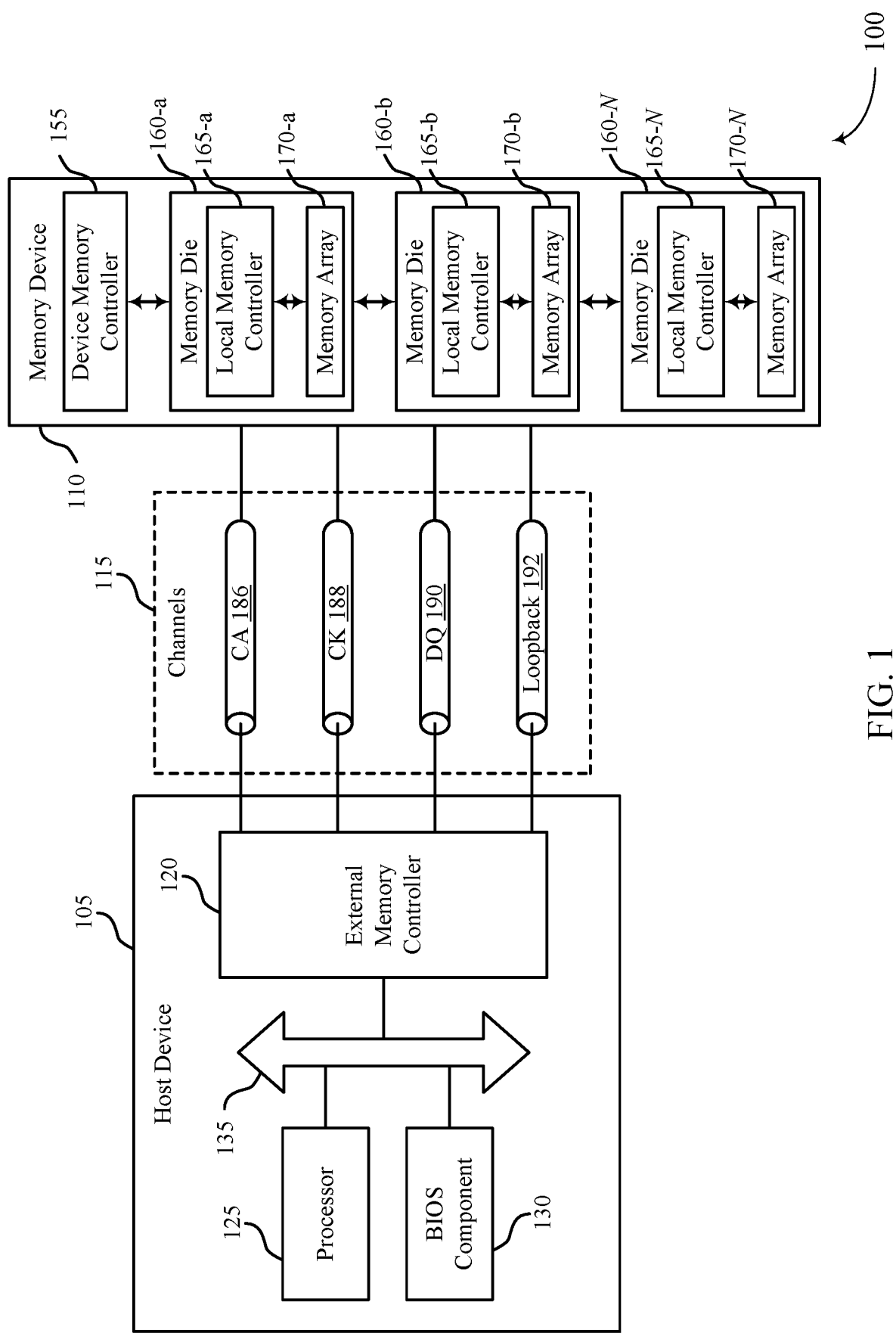
FIG. 1 illustrates an example of a system that supports output timing for channel loopback of a memory device in accordance with examples as disclosed herein.

Some systems may include a host device and a memory device that are coupled via one or more channels (e.g., information channels, data channels, command channels), and the one or more channels may operate in accordance with one or more clock signals (e.g., in accordance with outputting or latching relative to edges of the clock signals). As speeds of information transfer via such channels increase (e.g., from increasing frequencies of the clock signals), a likelihood of signal integrity issues or other errors over such channels may also increase. In some examples, a host device and a memory device may be configured to support evaluation of channel conditions (e.g., evaluating channels for signal integrity or other characteristics) to identify potential sources of signaling errors and perform corrective actions. An example of such techniques may be referred to as "loopback," which may include various implementations and operations of a memory device receiving a signal from a host device and relaying aspects of (e.g., indications of) the signal back to the host device (e.g., as a loopback signal, via a loopback channel, which may be performed without accessing a memory array of the memory device). A host device may be configured to evaluate channel conditions based on comparison between such transmitted and relayed signaling, and to potentially perform responsive actions based on such an evaluation.

In some loopback techniques, parameters for outputting a relayed signal may be associated with timing that is difficult (e.g., complex) to support, particularly with increasing frequencies of clock signals. For example, some industry standards (e.g., a memory specification, such as a specification of the Joint Electron Device Engineering Council (JEDEC)) may specify that information communicated to a memory device (e.g., write information) is associated with a first timing, which may be a center-aligned timing, where an edge of a clock signal is aligned in the middle of an information signal (e.g., between edges of the information signal as driven by the host device), whereas information communicated from a memory device (e.g., read information) is associated with a second timing, which may be an edge-aligned timing, where an edge of a clock signal is generally aligned with the edge of the information signal (e.g., as read or latched by the host device which may be based on a rising edge of the clock signal). In some examples (e.g., for circumstances in which information communicated to a memory device and information communicated from the memory device rely on the same or similar edges of clock signals), loopback circuitry of a memory device may lack sufficient time to reliably generate a loopback signal (e.g., at a terminal of the memory device) with such timing specifications.

In accordance with examples as disclosed herein, a host device and a memory device may be configured to support loopback functionality with timing parameters that are relaxed between a source signal from the host device and a relayed signal (e.g., a loopback signal) from the memory device. For example, a host device may be configured to output (e.g., transmit, via a first signal path of a first channel) a first signal indicative of a logic value in accordance with a rising edge of a first clock signal, and the first signal may be received by the memory device. The memory device may, in turn, be configured to output (e.g., transmit, via a second signal path of a second channel, such as a loopback channel) a second signal indicative of the logic value in accordance with a falling edge of a second clock signal. In some examples, the first clock signal may be generated by the host device and signaled to the memory device, and the second clock signal may be generated by the memory device (e.g., based on the first clock signal as received at the memory device) and signaled to the host device. In some other examples, the first clock signal and the second clock signal may be the same clock signal, which may be generated at the memory device based on a different clock signal received from the host device, and the clock signal generated by the memory device may be signaled to the host device.

In accordance with such techniques, the timing of the second signal (e.g., the loopback signal) may be different than timing implemented for other signaling from the memory device (e.g., signaling of read information which may be associated with edge-aligned timing in accordance with the first clock signal). By implementing different timing between the signaling of loopback information and the signaling of other information (e.g., read information) from the memory device, the system may implement a different duration (e.g., a longer duration) for establishing loopback signals to support more robust loopback functionality and higher communication speeds (e.g., higher clock frequencies).

Features of the disclosure are initially described in the context of systems and dies as described with reference to FIGS. 1 through 3. Features of the disclosure are described in the context of a loopback selection architecture and a timing diagram as described with reference to FIGS. 4 and 5. These and other features of the disclosure are further illustrated by and described with reference to apparatus diagrams and flowcharts that relate to output timing for channel loopback of a memory device as described with reference to FIGS. 6 through 9.

FIG. 1 illustrates an example of a system 100 that supports output timing for channel loopback of a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data for the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, among other channels or combinations thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data.

In some examples, clock signal channels 188 may be operable to communicate one or more clock signals between the host device 105 and the memory device 110. Clock signals may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal may be referred to as a control clock signal, a command clock signal, or a system clock signal, among others. A system clock signal may be generated by a system clock, which may include one or more hardware components (e.g., oscillators, crystals, logic gates, transistors).

In some examples, data channels 190 may be operable to communicate information (e.g., data, control information) between the host device 105 and the memory device 110. For example, the data channels 190 may communicate information (e.g., bidirectional) to be written to the memory device 110 or information read from the memory device 110.

In some examples, the channels 115 may support signaling in accordance with one or more clock signals (e.g., in accordance with outputting or latching relative to edges of the clock signals). As speeds of information transfer via channels 115 increase (e.g., in accordance with increasing frequencies of the clock signals), a likelihood of signal integrity issues or other errors over channels 115 may also increase. In some examples, a host device 105 and a memory device 110 may be configured to support evaluations of channel conditions (e.g., evaluating channels 115 for signal integrity or other characteristics) to identify potential sources of signaling errors and perform corrective actions. An example of such techniques may be referred to as "loopback," which may include various implementations of a memory device 110 receiving a signal from a host device 105 and relaying aspects of the signal back to the host device 105 (e.g., as a loopback signal via a loopback channel 192, which may be performed without accessing a memory array 170). A host device 105 may be configured to evaluate channel conditions based on comparisons between such transmitted and relayed signaling and to potentially perform responsive actions based on such an evaluation.

In some loopback techniques, parameters for outputting a relayed signal over a loopback channel 192 may be associated with timing that is difficult to support, particularly with increasing frequencies of clock signals. For example, some industry standards (e.g., a memory specification, such as a JEDEC specification) may specify that information communicated to a memory device 110 (e.g., write information, data transmitted by a host device 105 over a DQ channel 190) is associated with a center-aligned timing, where an edge of a clock signal is aligned in the middle of an information signal (e.g., between edges of the information signal, as driven by the host device 105 at a terminal of the host device 105), whereas information communicated from a memory device 110 (e.g., read information, data transmitted by a memory device 110 over a DQ channel or a loopback channel 192) is associated with an edge-aligned timing, where an edge of the clock signal is generally aligned with the edge of the information signal (e.g., as read or latched by the host device 105, via a terminal of the host device 105, which may be based on a rising edge of the clock signal). In some examples (e.g., for circumstances in which information communicated to a memory device 110 and information communicated from the memory device 110 rely on the same or similar edges of clock signals), loopback circuitry of a memory device 110 may lack sufficient time to reliably generate a loopback signal (e.g., at a terminal of the memory device 110) with such timing specifications.

In accordance with examples as disclosed herein, the system 100 may be configured to support loopback functionality with timing parameters that are relaxed between a source signal from a host device 105 and a relayed signal (e.g., a loopback signal) from a memory device 110. For example, a host device 105 (e.g., an external memory controller 120) may be configured to output (e.g., transmit, via a first signal path of a first channel, such as a DQ channel 190) a first signal indicative of a logic value in accordance with a rising edge of a first clock signal, and the first signal may be received by the memory device 110. The memory device 110 (e.g., a device memory controller 155, a local memory controller) may, in turn, be configured to output (e.g., transmit, via a second signal path of a second channel, such as a loopback channel 192) a second signal indicative of the logic value in accordance with a falling edge of a second clock signal. In some examples, the first clock signal may be generated by the host device 105 and signaled to the memory device 110 (e.g., over a first clock signal channel 188), and the second clock signal may be generated by the memory device 110 (e.g., based on the first clock signal as received at the memory device 110) and signaled to the host device 105 (e.g., over a second clock signal channel 188, over a loopback channel 192). In some other examples, the first clock signal and the second clock signal may be the same clock signal, which may be generated at the memory device 110 based on a different clock signal received from the host device 105 (e.g., via a clock signal channel 188), and the clock signal generated by the memory device 110 may be signaled to the host device 105.

In accordance with such techniques, the timing of the second signal (e.g., the loopback signal) may be different than timing implemented for other signaling from the memory device 110 (e.g., signaling of read information, which may be associated with edge-aligned timing in accordance with the first clock signal). By implementing different timing between the signaling of loopback signaling and the signaling of other information (e.g., read information) from the memory device 110, the system 100 may implement a longer duration for establishing loopback signals (e.g., at a terminal of the memory device 110), which may support more robust loopback functionality and higher communication speeds (e.g., higher clock frequencies).

Figure 2:
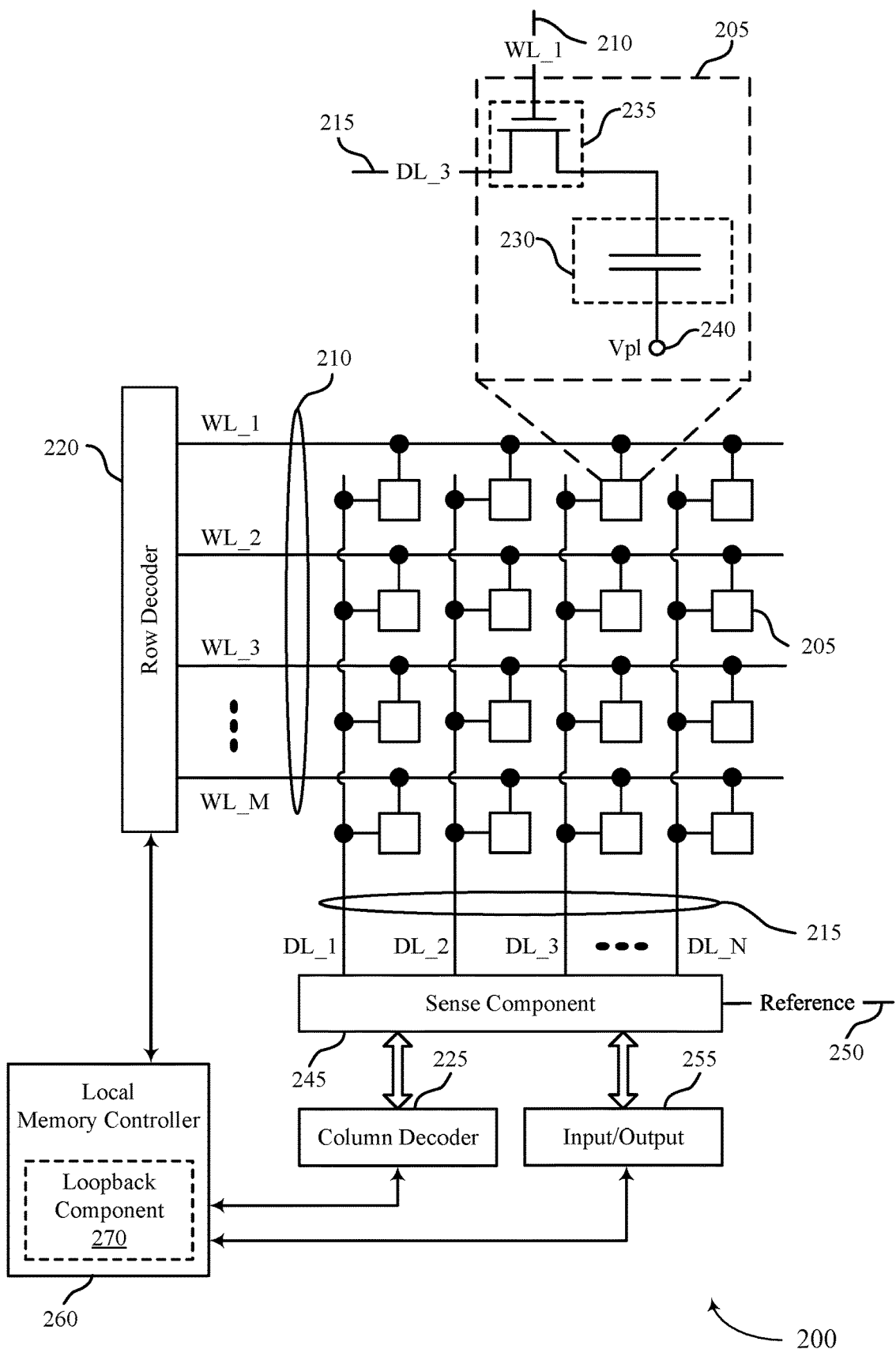
FIG. 2 illustrates an example of a memory die that supports output timing for channel loopback of a memory device in accordance with examples as disclosed herein.

FIG. 2 illustrates an example of a memory die 200 that supports output timing for channel loopback of a memory device in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address. Selecting or deselecting the memory cell 205 may be accomplished by activating or deactivating the switching component 235 using a word line 210.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

In accordance with examples as disclosed herein, the memory die 200 (e.g., a loopback component 270 of a local memory controller 260) may be configured to support loopback functionality with timing parameters that are relaxed between a source signal (e.g., from a host device 105, from a device memory controller 155) and a relayed signal (e.g., a loopback signal) from the memory die 200. For example, a loopback component 270 may be configured to receive (e.g., via a first signal path of a first channel) a first signal indicative of a logic value in accordance with a rising edge of a first clock signal. The loopback component 270 may, in turn, be configured to output (e.g., transmit, via a second signal path of a second channel, such as a loopback channel) a second signal indicative of the logic value in accordance with a falling edge of a second clock signal. In some examples, the first clock signal may be received by the memory die 200 (e.g., from a host device 105, from a device memory controller 155), and the second clock signal may be generated by the memory die (e.g., by the local memory controller 260, by the loopback component 270, based on the first clock signal as received at the memory die 200) and signaled by the memory die 200. In some other examples, the first clock signal and the second clock signal may be the same clock signal, which may be generated at the memory die 200 based on a different clock signal (e.g., a clock signal received from a host device 105, a clock signal received from a device memory controller 155), and the clock signal generated by the memory die 200 may be signaled by the memory die 200. In accordance with such techniques, the timing of the second signal (e.g., the loopback signal) may be different than timing implemented for other signaling from the memory die 200 (e.g., signaling of read information, which may be associated with edge-aligned timing in accordance with the first clock signal).

Figure 3:
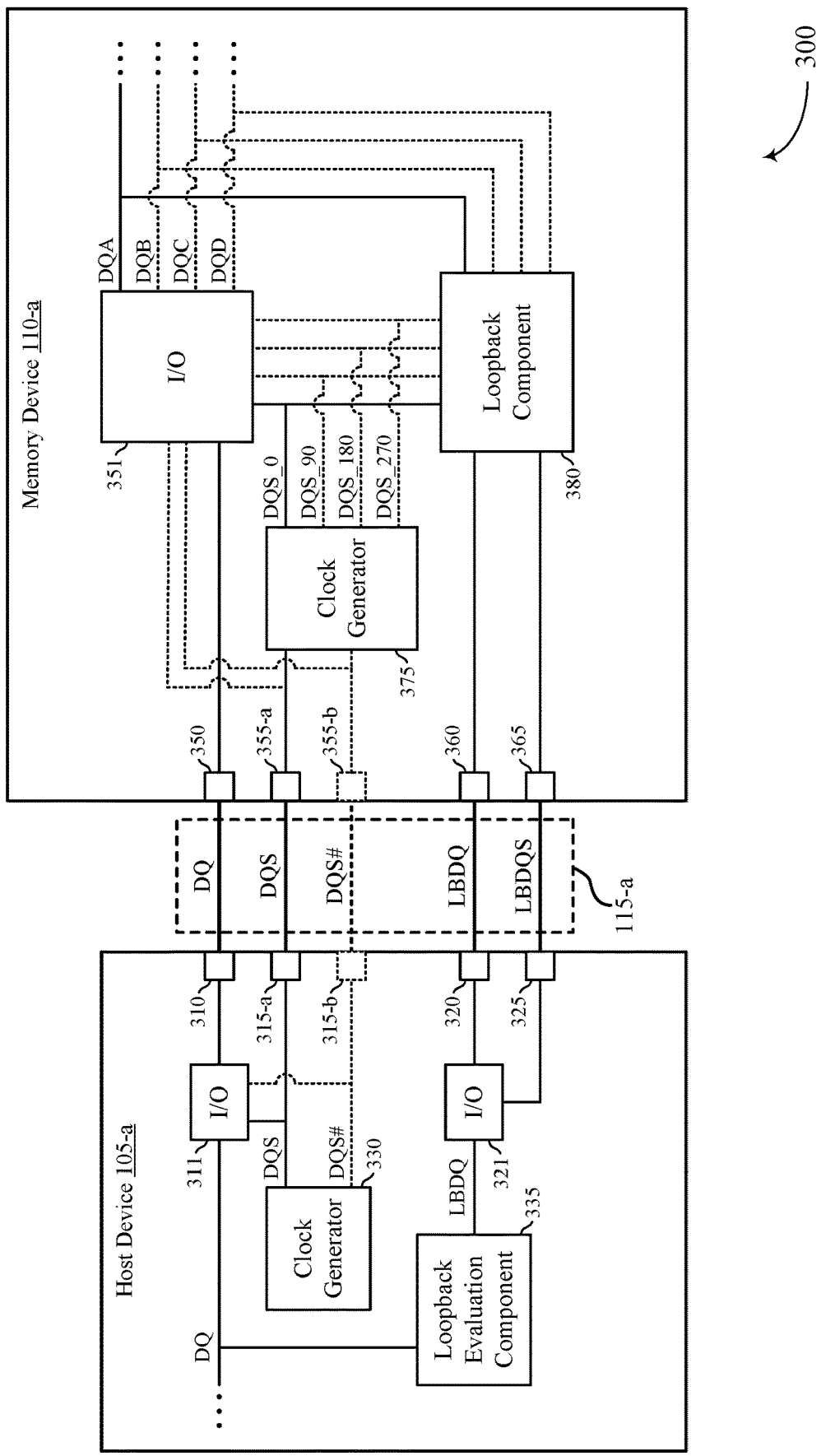
FIG. 3 illustrates an example of a system that supports output timing for channel loopback of a memory device in accordance with examples as disclosed herein.

FIG. 3 illustrates an example of a system 300 that supports output timing for channel loopback of a memory device in accordance with examples as disclosed herein. The system 300 includes a host device 105-a and a memory device 110-a that are coupled via channels 115-a, which may be examples of the respective components described with reference to FIG. 1.

Each of the channels 115-*a* may support communication over one or more signal paths between a respective terminal of the host device 105-*a* and a respective terminal of the memory device 110-*a*. For example, the channels 115-*a* may include a DQ channel (e.g., an example of a data channel 190) between a terminal 310 of the host device 105-*a* and a terminal 350 of the memory device 110-*a*. Although illustrated as a single signal path between single terminals at each device, a DQ channel may include any quantity of one or more signal paths and respective terminals at each device (e.g., as a DQ bus, which may be associated with 4 signal paths, 8 signal paths, 16 signal paths, 32 signal paths, 64 signal paths, and so on). The channels 115-*a* may also include a DQS channel (e.g., a data strobe channel, an example of a clock signal channel 188), which may include quantity of one or more signal paths between a respective terminal 315 of the host device 105-*a* and a respective terminal 355 of the memory device 110-*a*. In some examples, a timing of a clock signal conveyed over the DQS channel may be associated with a timing of communication over the DQ channel (e.g., a timing for signal latching for reception along one or more signal paths of the DQ channel, a timing for terminal biasing for signal transmission along one or more signal paths of the DQ channel). In the example of system 300, the DQS channel may be associated with two signal paths for conveying a DQS signal and a DQS #signal (e.g., a complementary clock signal, which may be associated with signal state that is opposite from the DQS signal). In some other examples, a DQS #signal and associated signal paths and terminals may be omitted. Although the terminals of the memory device 110-*a* are illustrated as being separated from respective terminals of the host device 105-*a*, in some examples the respective terminals of the host device 105-*a* and the memory device 110-*a* may be in direct contact with one another.

The host device 105-*a* and the memory device 110-*a* may be configured to support various techniques for evaluating signaling conditions associated with communications over the channels 115-*a*. Although some techniques for such an evaluation may include the host device 105-*a* writing data to a memory array 170 (not shown) of the memory device 110-*a* (e.g., by signaling a write command), reading the written data from the memory array 170 (e.g., by signaling a read command), and comparing the written data and the read data, such techniques may be relatively slow, or may not differentiate from errors that are not related to signaling over the channels 115-*a* themselves, among other considerations. Thus, the host device 105-*a* and the memory device 110-*a* may be configured to support a loopback functionality, which may include various implementations of the memory device 110-*a* receiving a signal from the host device 105-*a* and relaying aspects of the signal back to the host device 105-*a* (e.g., without storing information associated with the signal to a memory array 170 of the memory device 110-*a*).

To support such a loopback functionality between the host device 105-*a* and the memory device 110-*a*, the channels 115-*a* may also include one or more loopback channels, which may be examples of a loopback channel 192 described with reference to FIG. 1. For example, the channels 115-*a* may include a LBDQ channel (e.g., a loopback data channel, an example of a loopback channel 192) between a terminal 320 of the host device 105-*a* and a terminal 360 of the memory device 110-*a*. The channels 115-*a* may also include a LBDQS channel (e.g., a loopback data strobe channel, an example of a loopback channel 192, an example of a clock signal channel 188) between a terminal 325 of the host device 105-*a* and a terminal 365 of the memory device 110-*a*. In some examples, a timing of a clock signal conveyed over the LBDQS channel may be associated with a timing of communication over the LBDQ channel (e.g., a timing for signal latching for reception along a signal path of the LBDQ channel, a timing for terminal biasing for transmission along a signal path of the LBDQ channel). In some examples, the LBDQ channel may be configured to provide a relay of information associated with signaling over the DQ channel, and a clock signal associated with a LBDQS channel may be based on a clock signal associated with a DQS channel.

The circuitry and terminals of the host device 105-*a* and memory device 110-*a* may be implemented with various configurations that support the described techniques for loopback by the memory device 110-*a*. For example, the host device 105-*a* may include an I/O 311 (e.g., an input/output component) that is coupled with the terminal 310 for communicating over the DQ channel. The I/O 311 may be included in an external memory controller 120 and, in some examples, may be configured to support bidirectional communications. For example, to support signal transmission over the DQ channel (e.g., for circumstances in which the host device 105-*a* has biasing authority over the DQ channel), the I/O 311 may be configured to bias the terminal 310 with voltages corresponding to respective logic values to be communicated over the DQ channel (e.g., to the memory device 110-*a*), which may be conveyed to the terminal 350 via a signal path of the DQ channel. To support signal reception over the DQ channel (e.g., for circumstances in which the memory device 110-*a* has biasing authority over the DQ channel), the I/O 311 may be configured to latch voltages of the terminal 310, which may correspond to respective logic values to be received over the DQ channel (e.g., from the memory device 110-*a*, in accordance with a biasing of the terminal 350 by the memory device 110-*a*).

The I/O 311 may operate in accordance with a timing of a clock signal, such as a DQ clock signal (e.g., associated with a DQS signal, associated with a DQS signal and a DQS #signal), which may be generated by a clock generator 330 (e.g., of an external memory controller 120, based on an oscillator of the host device 105-*a*). For example, for signal transmission over the DQ channel, biasing of the terminal 310 may be considered to be "center aligned," in which case a transition of the clock signal (e.g., an edge of a DQ clock signal) may be between transitions of the biasing of the terminal 310 by the I/O 311. Such alignment may support the memory device 110-*a* latching a voltage of the terminal 350, based at least in part on the clock signal (e.g., as signaled by the host device 105-*a* via terminals 315, over one or more DQS channels), between transitions of the biasing of the terminal 310 by the I/O 311, which may support the memory device 110-*a* latching a relatively stabilized signal. For signal reception over the DQ channel, signaling via the terminal 310 may be considered to be "edge aligned," in which case a transition of the clock signal (e.g., an edge of a DQ clock signal) may be used to initiate a latching of a voltage of the terminal 310 by the I/O 311. In some examples, the I/O 311 may implement aspects of a serializer/deserializer, which may involve the I/O 311 communicating serialized information via the terminal 310 and communicating parallelized information with other portions of the host device 105-*a* (e.g., via multiple signal paths), where related serialization or deserialization also may be performed based on the clock signal generated by the clock generator 330.

The memory device 110-*a* may include one or more I/Os 351 that are coupled with terminals 350 for communicating over the DQ channel. An I/O 351 may be included in a device memory controller 155 or a local memory controller 165 (among other examples) and, in some examples, may also be configured to support bidirectional communications. For example, to support signal reception over the DQ channel (e.g., for circumstances in which the host device 105-*a* has biasing authority over the DQ channel), the I/O 351 may be configured to latch voltages of the terminal 350, which may correspond to respective logic values to be received over the DQ channel (e.g., from the host device 105-*a*, in accordance with a biasing of the terminal 310 by the host device 105-*a*). To support signal transmission over the DQ channel (e.g., for circumstances in which the memory device 110-*a* has biasing authority over the DQ channel), the I/O 351 may be configured to bias the terminal 350 with voltages corresponding to respective logic values to be communicated over the DQ channel (e.g., to the host device 105-*a*), which may be conveyed to the terminal 310 over a signal path of the DQ channel.

The I/O 351 may also operate in accordance with a timing of a clock signal, such as a DQ clock signal, which may be generated by a clock generator 375 (e.g., of a device memory controller 155 or a local memory controller 165, based on a clock signal received from the host device 105-*a*), or may be a clock signal as received via a terminal 355 (e.g., in which case a clock generator 375 may be omitted). For example, for signal reception over the DQ channel, a transition of the clock signal (e.g., an edge of a DQ clock signal from the clock generator 375) may be used to initiate a latching of a voltage of the terminal 350 by the I/O 351. For signal transmission over the DQ channel, biasing of the terminal 350 may be aligned (e.g., centered, in time) with edges of a DQ clock signal from the clock generator 375, which may also be aligned with edges of a DQ clock signal from the clock generator 330. Accordingly, a transition of such clock signals may be between transitions of the biasing of the terminal 350 by the I/O 351. In some examples, such techniques may involve a delay-locked loop (DLL) functionality for aligning timing between the clock signal and the biasing of the terminal 350 by the I/O 351. Such alignment may support the host device 105-*a* latching a voltage of the terminal 310, based at least in part on the clock signal of the clock generator 330, between transitions of the biasing of the terminal 350 by the I/O 351, which may support the host device 105-*a* latching a relatively stabilized signal.

In some examples, the I/O 351 may support serialization or deserialization, which may involve the I/O 351 communicating serialized information via the terminal 350 and communicating parallelized information with other portions of the memory device 110-*a* (e.g., via multiple signal paths). In some examples, such techniques may be supported by the clock generator 375 generating clock signals in accordance with a multi-phase clock (e.g., a multi-phase data strobe), such as a four-phase clock. For example, the clock generator 375 may generate clock signals DQS_0, DQS_90, DQS_180, and DQS_270 (e.g., based on the clock signal DQS, based on the clock signals DQS and DQS #), which may correspond to four different phases of a data strobe. In some examples, the different phases of the data strobe may correspond to different phases of a data signal (e.g., different phases of the DQ signal, such as data signal DQA being associated with clock signal DQS_0, data signal DQB being associated with clock signal DQS_90, data signal DQC being associated with clock signal DQS_180, and data signal DQD being associated with clock signal DQS_270), where the different phases of the data signal may be communicated serially between the I/O 315 and the terminal 350 and in parallel (e.g., along different signal paths) elsewhere in the memory device 110-*a*. In some examples, the different phases of the data strobe may operate at a lower frequency than a clock signal received from the host device 105-*a* (e.g., at a lower frequency than a DQS signal or DQS #signal).

The memory device 110-*a* may also include a loopback component 380 (e.g., of a device memory controller 155, or a local memory controller 165), which may support the memory device 110-*a* relaying signals back to the host device 105-*a* (e.g., without accessing a memory array 170 of the memory device 110-*a*, without storing information in a memory array 170, without issuing read commands or performing read operations, as a U-turn circuit, as a feedback circuit). For example, the loopback component 380 may be configured to output a loopback data signal by biasing the terminal 360 with voltages corresponding to respective logic values to be communicated over the LBDQ channel (e.g., to the host device 105-*a*), which may be conveyed to the terminal 320 over a signal path of the LBDQ channel. Such logic states may be intended to correspond to logic states received from the host device 105-*a* over the DQ channel (e.g., under nominal or otherwise favorable channel conditions), and may be used by the host device 105-*a* to evaluate conditions of the channels 115-*a* (e.g., whether the logic value transmitted to the memory device 110-*a* was returned by the loopback component 380). The loopback component 380 may support such biasing in accordance with a timing of a clock signal, such as a LBDQS clock signal, which may be based at least in part on (e.g., selected from) a clock signal generated by the clock generator 375. In various examples, biasing of the terminal 360 may be supported by an I/O component of the loopback component 380 (not shown) or by coupling the terminal 360 with the I/O 351, among other configurations. In some examples, such techniques may be performed in response to a command, such as a write command, from the host device 105-*a*, which may be accompanied by an indication (e.g., a command, a request, from the host device 105-*a*) to activate loopback functionality. In some other examples, such techniques may be supported by looping back information associated with a DQ channel without any indication of a command (e.g., without a write command, without a read command).

In some examples, the loopback component 380 may be configured to relay information in accordance with a certain phase of multiple phases of the data strobe or data signal (e.g., a configured phase, a commanded phase). For example, the loopback component 380 may be configured (e.g., as a default, as a preconfiguration) to relay information in accordance with a first phase, such as performing loopback of a DQA signal, or in accordance with a DQS_0 data strobe, among other configurations of phases. Additionally, or alternatively, in some examples, the loopback component 380 may be signaled (e.g., commanded, requested) to relay information in accordance with a certain phase. For example, the host device 105-*a* may transmit an indication of a phase to the memory device 110-*a* (e.g., via a device memory controller 155) and the loopback component 380 may select a data strobe associated with the indicated phase (e.g., selecting DQS_0 or another phase of the data strobe), or select a data signal associated with the indicated phase (e.g., selecting DQA or another phase of the data signal), or both based at least in part on the received indication. In some examples, loopback in accordance with a certain phase of multiple phases may support loopback at a lower frequency than a frequency of a data channel or a clock signal (among other examples) from the host device 105-*a* (e.g., at a lower frequency than signaling over a DQ channel, at a lower frequency than a DQS signal or a DQS #signal), which may improve a robustness of loopback functionality due to longer durations for signal development, latching, and comparison than if a higher frequency were implemented.

The host device 105-*a* may include an I/O 321 (e.g., of an external memory controller 120) that is coupled with the terminal 320 for receiving signaling over the LBDQ channel. To support signal reception over the LBDQ channel, the I/O 321 may be configured to latch voltages of the terminal 320, which may correspond to respective logic values to be received over the LBDQ channel (e.g., from the memory device 110-*a*, in accordance with a biasing of the terminal 360 via the loopback component 380). The I/O 321 may also operate in accordance with a timing of the LBDQS clock signal, which may be received via the terminal 325. For example, for signal reception over the LBDQ channel, a transition of the LBDQS clock signal (e.g., an edge of the LBDQS clock signal) may be used to initiate a latching of a voltage of the terminal 320 by the I/O 321.

In some examples, a value of the data signal to be returned via the LBDQ channel may be latched at the memory device 110-*a* in accordance with a rising edge of a clock signal, which may correspond to or be otherwise generally aligned with a rising edge of a DQ clock signal, a rising edge of the LBDQS signal, or both. In some examples, such latching may not provide sufficient time for the memory device 110-*a* to bias the terminal 360 in a manner that the host device 105-*a* can also latch the return value (e.g., as a voltage of the terminal 320) in accordance with a rising edge of a clock signal. Thus, in accordance with examples as disclosed herein, the memory device 110-*a* or a component thereof (e.g., the I/O 351, the loopback component 380) may be configured to receive a first signal indicative of a logic value via the terminal 350 in accordance with a rising edge of a clock signal, such as a rising edge of a clock signal generated by the clock generator 330 (e.g., a DQS signal, a DQS #signal), or a rising edge of a clock signal generated by the clock generator 375 (e.g., a DQS_0 signal, a DQS_90 signal, a DQS_180 signal, a DQS_270 signal) that may be based at least in part on a rising edge of a clock signal generated by the clock generator 330, or a rising edge of the LBDQS signal that may be based at least in part on a clock signal generated by the clock generator 330, a clock signal generated by the clock generator 375, or both. The memory device 110-*a* may be further configured to output a second signal, indicative of the logic value, in accordance with a falling edge of a clock signal, such as a falling edge of the LBDQS signal, which may provide a more-relaxed timing between the memory device 110-*a* latching the received signal associated with the logic value and outputting the loopback signal (e.g., biasing the terminal 360) to be received by the host device 105-*a* (e.g., via the terminal 320).

To support such techniques, the I/O 321 may be configured to latch a voltage of the terminal 320 based on a falling edge of the LBDQS signal received via the terminal 325, which may be different than other techniques for receiving signaling from the memory device 110-*a* (e.g., implementing a different relationship between loopback strobe and data). For example, the described techniques for latching based on a falling edge of a clock signal may differ from techniques that latch information from the memory device 110-*a* based on a rising edge of a clock signal, such as the I/O 311 latching a DQ signal based on a rising edge of a DQ clock signal generated by the clock generator 330, or other techniques for loopback that may latch an LBDQ signal based on a rising edge of an LBDQS signal. The described techniques for latching loopback information based on a falling edge of a clock signal provide relaxed timing, specific to loopback functionality, that supports a longer duration for establishing loopback signals, thereby supporting more robust loopback functionality and higher communication speeds (e.g., higher clock frequencies) for such techniques.

In some examples, the host device 105-*a* may include a loopback evaluation component 335 (e.g., of an external memory controller 120), which may perform various comparisons to evaluate conditions of the channels 115-*a*. For example, the loopback evaluation component 335 may perform a comparison between a logic value of the DQ signal (e.g., which may be transmitted to the memory device 110-*a*) and a logic value of the LBDQ signal (e.g., which may be received from the memory device 110-*a*). If the received logic value is equal to the transmitted logic value, the channels 115-*a* may be performing nominally, and the host device 105-*a* and the memory device 110-*a* may proceed with normal operations. If the received logic value is different than the transmitted logic value, the host device 105-*a* may proceed with a corrective action, which may include initiating a change in operations with the memory device 110-*a*. For example, the host device 105-*a* may change a reference voltage for an input data buffer associated with one or more DQ channels (e.g., associated with the I/O 311, associated with the I/O 351, or both), or change transmission parameters of an output driver (e.g., of the I/O 311, of the I/O 351, or of both), among other corrective operations that may resolve signal integrity issues associated with the DQ channel.

Figure 4:
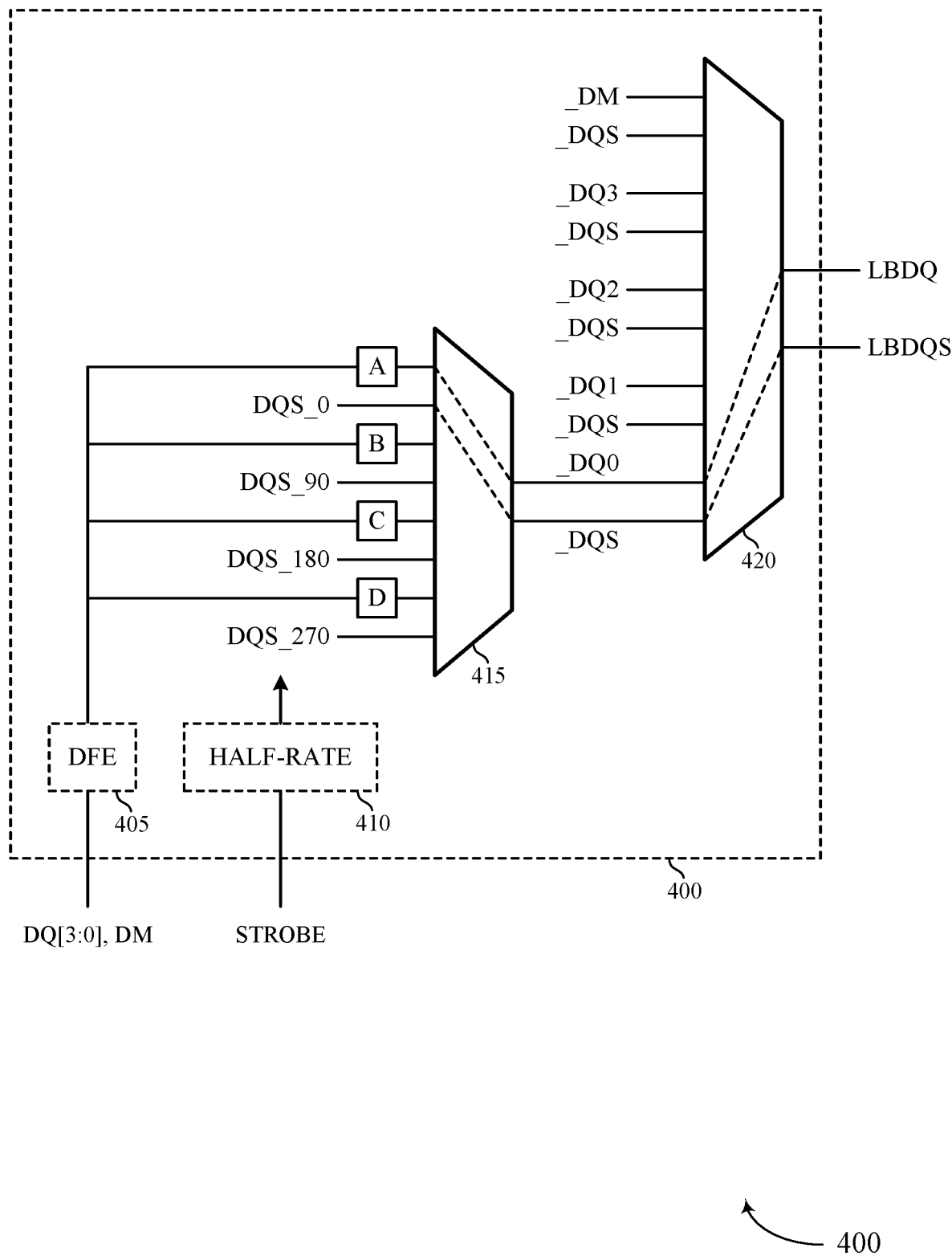
FIG. 4 illustrates an example of a loopback selection architecture that supports output timing for channel loopback of a memory device in accordance with examples as disclosed herein.

FIG. 4 illustrates an example of a loopback selection architecture 400 that supports output timing for channel loopback of a memory device in accordance with examples as disclosed herein. The loopback selection architecture 400 illustrates an example of circuitry that may be included in a memory device 110 to support selections of signaling for loopback to a host device 105.

The loopback selection architecture 400 may be configured to receive signaling associated with one or more terminals of a data channel, such as signals associated with a DQ0 terminal, a DQ1 terminal, a DQ2 terminal, and a DQ3 terminal (e.g., in accordance with a data bus DQ[3:0]). In some examples, such a data channel may be associated with data mask (DM) signaling, which may also be received by the loopback selection architecture 400 for selection. In some examples, such signaling may be processed through a decision feedback equalization (DFE) component 405 but, in some other examples, such processing may be omitted. The loopback selection architecture 400 may also be configured to receive a data strobe signal (e.g., a DQS signal, or a DQS #signal, or any combination thereof), which may be processed via a half-rate component 410 (e.g., of a clock generator 375) to reduce a frequency of signaling received via the data strobe. In some examples, the loopback selection architecture 400 may include circuitry for the generation of clock signals associated with different phases of the data strobe (e.g., DQS_0, DQS_90, DQS_180, and DQS_270), or may otherwise be configured for a selection among such phases of the data strobe.

In the example of loopback selection architecture 400, each terminal of the data channel (e.g., each index of the data bus DQ[3:0]) and the data strobe may be associated with multiple phases. For example, each terminal of the data channel may be associated with four phases (e.g., serialization phases), denoted as A, B, C, or D, and each phase may be associated with a different phase of the data strobe (e.g., DQS_0, DQS_90, DQS_180, and DQS_270, respectively). Although such signals and signal paths are illustrated for the first terminal of the data channel (e.g., DQ0), such signals and signal paths, and associated circuitry, may be repeated for each of the other signals and signal paths of the data channel (e.g., repeated for DQ1, DQ2, DQ3, and DM).

The loopback selection architecture 400 may support a selection from available data channel signals and data strobe phases for output on one or more loopback channels (e.g., an LBDQ channel, an LBDQS channel). For example, the loopback selection architecture 400 may include a respective multiplexer 415 for each data channel terminal, which may be operable to select a certain phase of a multi-phase (e.g., serialized) data signal. In the illustrated example, the multiplexer 415 may be configured for selecting a first phase of signaling (e.g., forwarding the signals DQA and DQS_0 for data channel terminal DQ0). The loopback selection architecture 400 may also include a multiplexer 420, which may be operable to select a certain data channel terminal for loopback. In the illustrated example, the multiplexer 420 may be configured for selecting signaling associated with the data channel terminal DQ0 (e.g., forwarding the signals DQA and DQS_0 for data channel terminal DQ0 for output on the LBDQ and LBDQS channels, respectively).

The loopback selection architecture 400 may be configured to relay signaling based on indications (e.g., commands, requests) for operating the multiplexers 415 and 420. For example, a host device 105 may transmit an indication of a phase to a memory device 110 that includes the loopback selection architecture 400 (e.g., via a device memory controller 155) and the loopback selection architecture 400 may be configured to select a data strobe associated with the indicated phase (e.g., for selecting signal DQS_0), or to select a data signal associated with the indicated phase (e.g., for selecting signal DQA), or for selecting a certain data channel terminal (e.g., for selecting terminal DQ0), or various combinations thereof based at least in part on the indication received from the host device 105. In some other examples, such indications may be generated at the memory device 110 (e.g., by a device memory controller 155, by a local memory controller 165), which may support various configurations or sweeping through different channel terminals, or phases thereof, for loopback to the host device 105.

Figure 5:
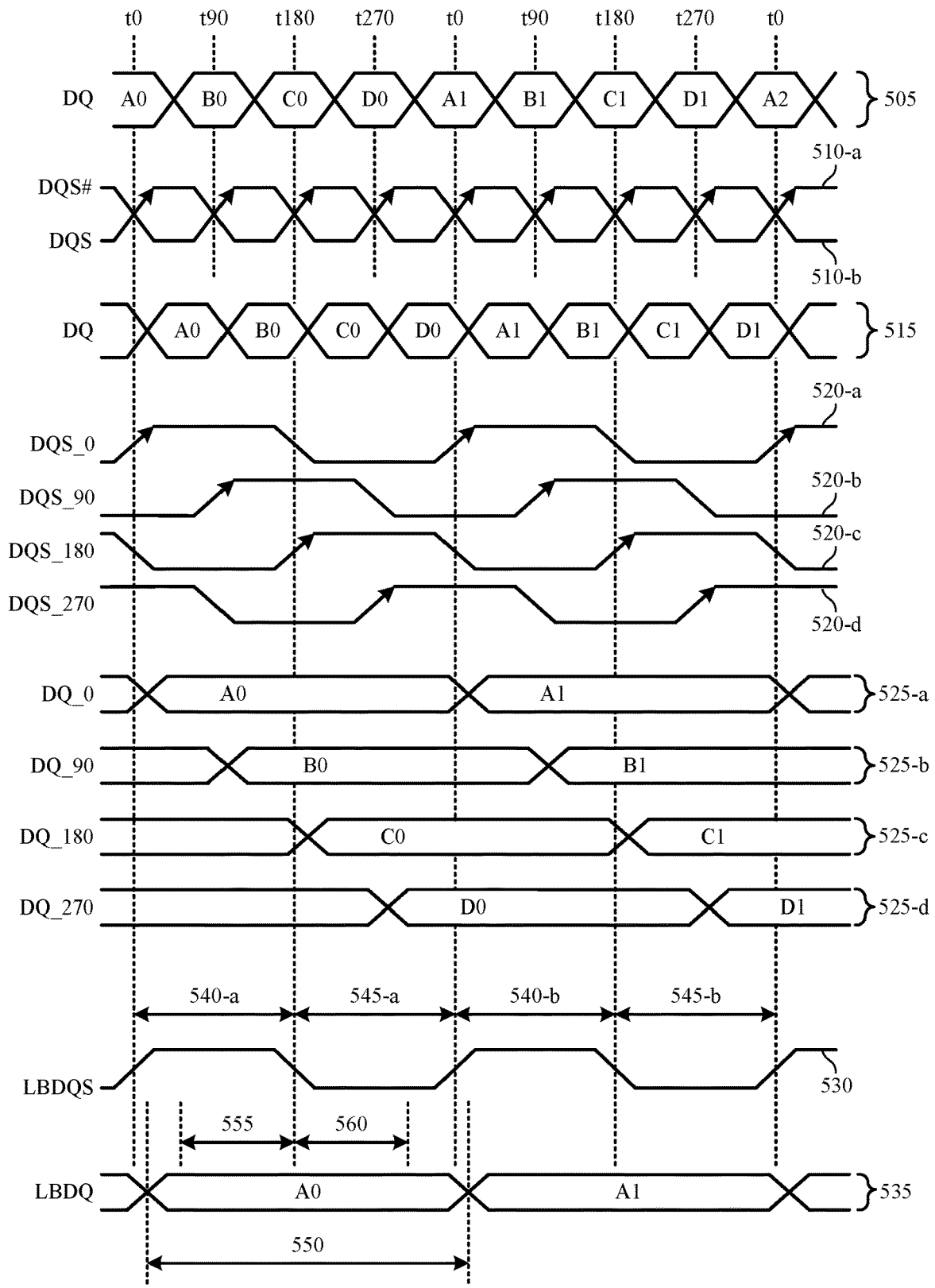
FIG. 5 illustrates an example of a timing diagram that supports output timing for channel loopback of a memory device in accordance with examples as disclosed herein.

FIG. 5 illustrates an example of a timing diagram 500 that supports output timing for channel loopback of a memory device in accordance with examples as disclosed herein. The timing diagram 500 illustrates examples of signaling, over time, that may be generated by or communicated between a host device 105 and a memory device 110 (e.g., over channels 115), which may be examples of the respective components described herein.

The timing diagram 500 illustrates a data signal 505 (e.g., a DQ signal at the host device 105), which may illustrate a biasing of a terminal 310 of the host device 105 (e.g., by an I/O 311, to communicate logic values to the memory device 110) that may be conveyed to a terminal 350 of the memory device 110 via a signal path of a data channel. The timing diagram 500 also illustrates clock signals 510 (e.g., a DQS signal and a DQS #signal), which may illustrate biasing of terminals 315 of the host device 105 (e.g., by a clock generator 330) that may be conveyed to terminals 355 of the memory device 110 via signal paths of a clock channel. The data signal 505 and clock signals 510 illustrate an example of center-aligned timing (e.g., from the perspective of the host device 105), where transitions of the clock signals 510 are aligned between (e.g., generally centered between) transitions of the data signal 505 to support the memory device 110 latching a relatively stabilized biasing of the data signal 505. The clock signals 510 may support aspects of a multi-phase clock such as a four-phase clock, with rising edges of the clock signal 510-*a* being associated with two phases (e.g., a 0-degree phase, a 180-degree phase) and rising edges of the clock signal 510-*b* being associated with two phases (e.g., a 90-degree phase, a 270-degree phase), in accordance with timing t0, t90, t180, and t270, as illustrated. Logic values of the data signal 505 may be described relative to the phases A, B, C, and D for a given numbered cycle (e.g., A0 being a logic value of a first phase, phase A, of a first cycle, cycle 0).

The timing diagram 500 also illustrates a data signal 515 (e.g., a DQ signal at the memory device 110), which may illustrate an example of a latching of the data signal 505 (e.g., by the memory device 110, by an I/O 351) based on rising edges of the clock signals 510 (e.g., where transitions of the data signal 515 are driven by the rising edges of the clock signals 510). In some examples, the data signal 515 may be illustrative of a serial latching of the data signal 505 by the memory device 110, or may be otherwise representative of a timing of how values of the data signal 505 may be latched at the memory device 110.

In some examples, a memory device 110 may perform a deserialization of the data signal 505, which may involve a latching based on signals of a multi-phase clock. For example, the timing diagram illustrates clock signals 520, which may include respective clock signals for each phase of a four-phase clock, which may be generated based on the clock signals 510-*a* and 510-*b* (e.g., by a clock generator 375 of the memory device 110). For example, a rising edge of the clock signal 520-*a* may be generated based on a first rising edge of the clock signal 510-*a*, a rising edge of the clock signal 520-*b* may be generated based on a first rising edge of the clock signal 510-*b*, a rising edge of the clock signal 520-*c* may be generated based on a second rising edge of the clock signal 510-*a*, and a rising edge of the clock signal 520-*d* may be generated based on a second rising edge of the clock signal 510-*b*, and so on. As illustrated, each of the clock signals 520 may have a lower frequency than the clock signals 510.

The timing diagram 500 also illustrates data signals 525 (e.g., DQ phase signals at the memory device 110), which may illustrate another example of a latching of the data signal 505 or of the data signal 515 (e.g., by the memory device 110, by an I/O 351) based on rising edges of the clock signals 520 (e.g., where transitions of a data signal 525 for a given phase may be driven by a rising edge of the corresponding clock signal 520 associated with the given phase). For example, the data signal 525-*a* may be generated based on latching the data signal 505 or the data signal 515 upon rising edges of the clock signal 520-*a*, the data signal 525-*b* may be generated based on latching the data signal 505 or the data signal 515 upon rising edges of the clock signal 520-*b*, and so on.

The timing diagram 500 also illustrates an example for selecting from the clock signals 520 and the data signals 525 (e.g., by a loopback component 380, by a multiplexer 415) to support loopback to a host device 105. For example, the timing diagram 500 illustrates a loopback clock signal 530 (e.g., a LBDQS signal, a loopback strobe signal) that may correspond to or be otherwise generated based on the clock signal 520-*a* (e.g., based on a selection of a 0-degree phase for loopback). The loopback clock signal 530 may illustrate biasing of a terminal 365 of the memory device 110 (e.g., by or via a loopback component 380) that may be conveyed to a terminal 325 of the host device 105 via a signal path of a loopback clock channel to signal the loopback clock signal 530 to the host device 105.

The loopback clock signal 530 may be associated with durations 540, which may correspond to a "Loopback LBDQS Output High Time" (e.g., tLBQSH), and durations 545, which may correspond to a "Loopback LBDQS Output Low Time" (e.g., tLBQSL). As illustrated in the timing diagram 500, the loopback clock signal 530 may have a frequency that is lower than a frequency of the clock signals 510 that are received from the host device 105, and may have a frequency that is equal to the frequency of cycles of the four-phase DQ clock. For example, each of the clock signals 510 may have multiple (e.g., two) rising edges for each rising edge of the loopback clock signal 530.

The timing diagram 500 also illustrates a loopback data signal 535 (e.g., an LBDQ signal at the memory device 110), which may illustrate a biasing of a terminal 320 of the memory device 110 (e.g., by or via a loopback component 380) that may be conveyed to a terminal 320 of the host device 105 via a signal path of a loopback data channel. The loopback data signal 535 may communicate logic values associated with the first phase of the DQ signaling (e.g., an "A" phase, a 0-degree phase), which may correspond to the phase of the clock signal 520 associated with the loopback clock signal 530 (e.g., as selected by a loopback component 380, as selected via a multiplexer 415). As illustrated in the timing diagram 500, falling edges of the loopback clock signal 530 may be aligned between (e.g., generally centered between) transitions of the loopback data signal 535 to support the host device 105 (e.g., an I/O 321) latching a relatively stabilized biasing of the loopback data signal 535 by the memory device 110. In some examples, such latching may be based on a first falling edge of the loopback clock signal 530 after a rising edge of a clock signal used to latch a value of the data signal 505 (e.g., a rising edge of a clock signal 510, a rising edge of a clock signal 520).

The biasing of a terminal 360 in accordance with the loopback data signal 535 may be configured to support setup and hold durations relative to falling edges of the loopback clock signal 530, which may support timing margins for the I/O 321 to latch the signal and capture a conveyed loopback logic value. For example, the biasing of the terminal 360 to convey a given loopback logic value may be associated with a biasing for at least a duration 555 before a falling edge of the loopback clock signal 530, where the duration 555 may correspond to a "Loopback Setup time for LBDQS" (e.g., tLBQ_Set, a setup time of tLBDQS and where tLBDQ is meant to remain stable). Additionally, or alternatively, the biasing of the terminal 360 to convey a given loopback logic value may be associated with a biasing for at least a duration 560 after a falling edge of the loopback clock signal 530, where the duration 560 may correspond to a "Loopback Hold time for LBDQS" (e.g., tLBQ_Hld, a hold time of tLBDQS and where tLBDQ is meant to remain stable). The loopback data signal 535 may also be associated with a duration 550, which may correspond to a "Loopback Data valid window of each UI per DRAM" (e.g., tLBDVW).

Accordingly, to support receiving loopback signaling, the host device 105 (e.g., an I/O 321) may be configured to latch a voltage of a terminal 320 based on a falling edge of a loopback clock signal 530 signal received via a terminal 325, which may be different than other techniques for receiving signaling from a memory device 110. For example, latching the loopback data signal 535 based on a falling edge of the loopback clock signal 530 may differ from techniques that latch read information from the memory device 110 based on a rising edge of a clock signal, such as an I/O 311 latching a data signal based on a rising edge of a clock signal 510, or other techniques for loopback that may latch an LBDQ signal based on a rising edge of an LBDQS signal, which may not be separated enough from a rising edge of a clock signal associated with receiving a data signal for loopback (e.g., a rising edge of a clock signal 510, a rising edge of a clock signal 520) to reliably support loopback signal generation. Thus, the described techniques for latching the loopback data signal 535 based on a falling edge of the loopback clock signal 530, which may correspond to a center-aligned timing from the perspective of a host device 105, may provide relaxed timing (e.g., specific to loopback functionality) that supports a longer duration for establishing loopback signals, thereby supporting more robust loopback functionality and higher communication speeds (e.g., higher clock frequencies) for such techniques.

Figure 6:
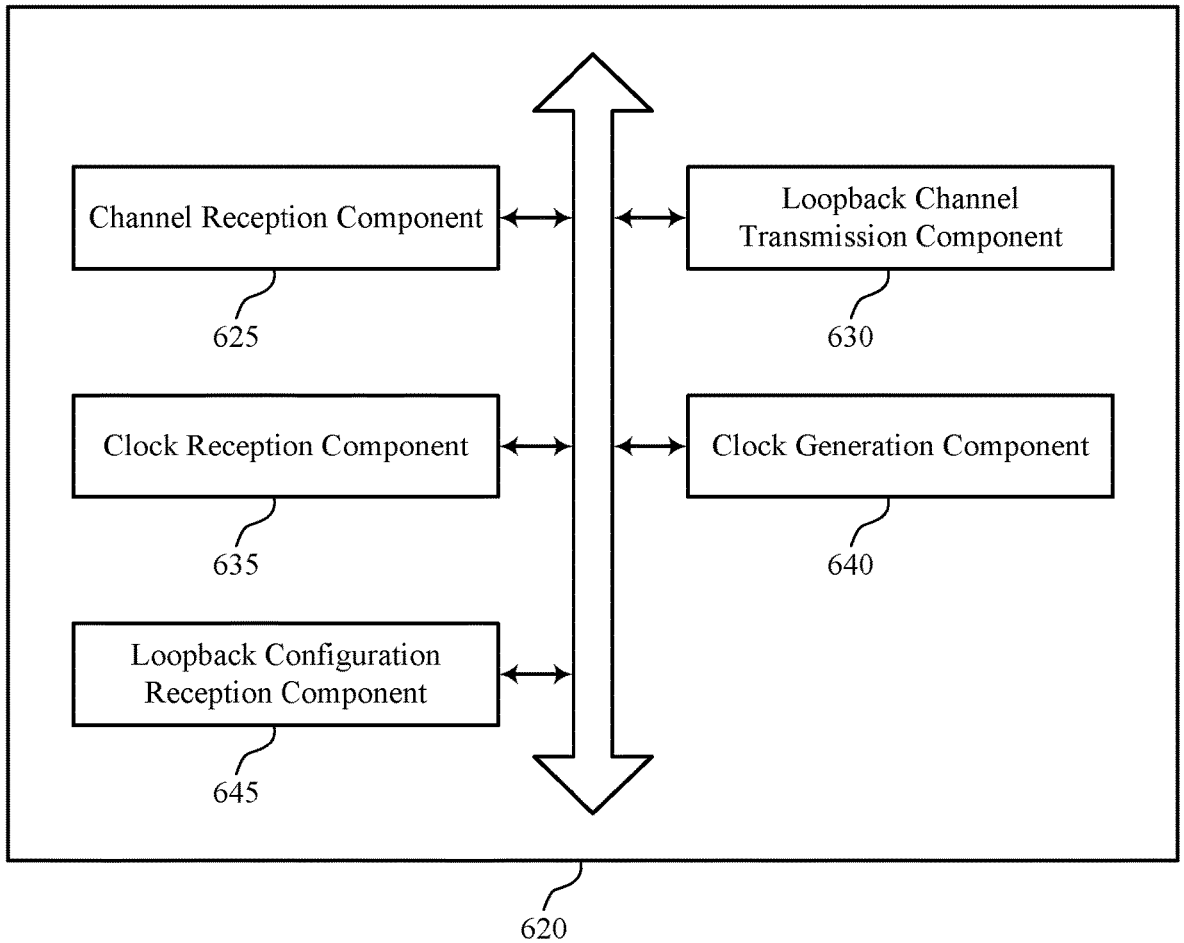
FIG. 6 shows a block diagram of a memory device that supports output timing for channel loopback of a memory device in accordance with examples as disclosed herein.

FIG. 6 shows a block diagram 600 of a memory device 620 that supports output timing for channel loopback of a memory device in accordance with examples as disclosed herein. The memory device 620 may be an example of aspects of a memory device as described with reference to FIGS. 1 through 5. The memory device 620, or various components thereof, may be an example of means for performing various aspects of output timing for channel loopback of a memory device as described herein. For example, the memory device 620 may include a channel reception component 625, a loopback channel transmission component 630, a clock reception component 635, a clock generation component 640, a loopback configuration reception component 645, or any combination thereof. Each of these components may communicate, directly or indirectly, with one another (e.g., via one or more buses).

The channel reception component 625 may be configured as or otherwise support a means for receiving, via a first terminal of the memory device 620 (e.g., as part of a loopback operation, in accordance with a loopback functionality), a first signal indicative of a logic value in accordance with a rising edge of a first clock signal communicated via a second terminal of the memory device 620. The loopback channel transmission component 630 may be configured as or otherwise support a means for outputting, via a third terminal of the memory device 620 (e.g., as part of the loopback operation, in accordance with the loopback functionality), a second signal indicative of the logic value in accordance with a falling edge of a second clock signal communicated via a fourth terminal of the memory device 620.

In some examples, the loopback channel transmission component 630 may be configured as or otherwise support a means for biasing the third terminal with a voltage associated with the logic value for at least a first duration before the falling edge of the second clock signal and at least a second duration after the falling edge of the second clock signal, and outputting the second signal may be based at least on biasing the third terminal with the voltage.

In some examples, the clock reception component 635 may be configured as or otherwise support a means for receiving the first clock signal via the second terminal of the memory device 620. In some examples, the clock generation component 640 may be configured as or otherwise support a means for generating the second clock signal for output via the fourth terminal of the memory device 620 based at least in part on the first clock signal.

In some examples, the clock reception component 635 may be configured as or otherwise support a means for receiving a third clock signal via a fifth terminal of the memory device 620. In some examples, the clock generation component 640 may be configured as or otherwise support a means for generating the second clock signal for output via the fourth terminal of the memory device 620 based at least in part on the first clock signal and the third clock signal.

In some examples, the first clock signal and the third clock signal may be associated with a multi-phase clock having a plurality of rising edges for each rising edge of the second clock signal.

In some examples, the loopback configuration reception component 645 may be configured as or otherwise support a means for receiving an indication of a phase of the multi-phase clock, and receiving the first signal indicative of the logic value may be based at least in part on the indication of the phase of the multi-phase clock.

In some examples, the loopback configuration reception component 645 may be configured as or otherwise support a means for receiving an indication of a phase of the multi-phase clock, and generating the second clock signal may be based at least in part on the indication of the phase of the multi-phase clock.

In some examples, the first clock signal and the third clock signal may each be associated with a first frequency and the second clock signal may be associated with a second frequency that is less than the first frequency.

In some examples, the falling edge of the second clock signal may be a first (e.g., earliest) falling edge of the second clock signal subsequent to the rising edge of the first clock signal.

Figure 7:
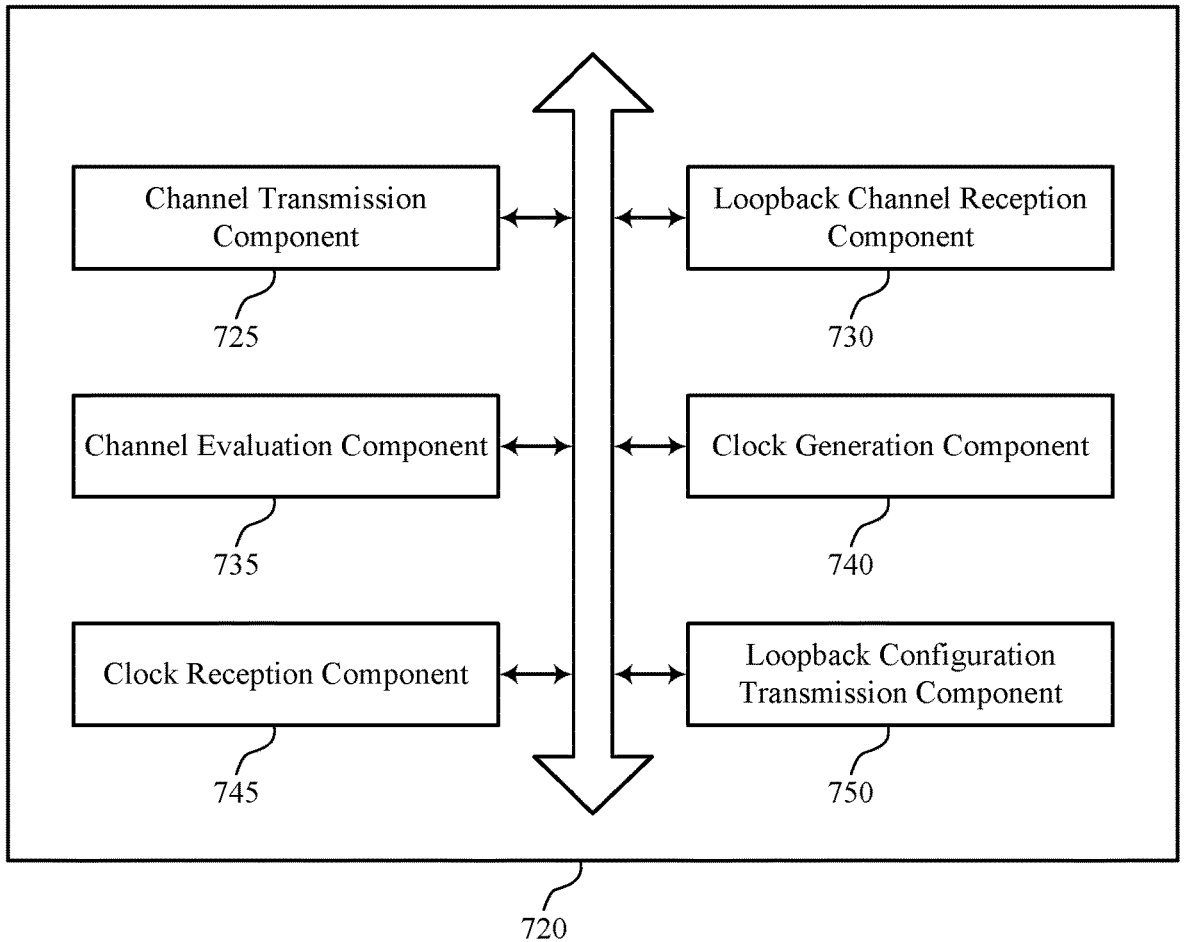
FIG. 7 shows a block diagram of a host device that supports output timing for channel loopback of a memory device in accordance with examples as disclosed herein.

FIG. 7 shows a block diagram 700 of a host device 720 that supports output timing for channel loopback of a memory device in accordance with examples as disclosed herein. The host device 720 may be an example of aspects of a host device as described with reference to FIGS. 1 through 5. The host device 720, or various components thereof, may be an example of means for performing various aspects of output timing for channel loopback of a memory device as described herein. For example, the host device 720 may include a channel transmission component 725, a loopback channel reception component 730, a channel evaluation component 735, a clock generation component 740, a clock reception component 745, a loopback configuration transmission component 750, or any combination thereof. Each of these components may communicate, directly or indirectly, with one another (e.g., via one or more buses).

The channel transmission component 725 may be configured as or otherwise support a means for outputting, via a first terminal of the host device 720 (e.g., as part of a loopback operation, in accordance with a loopback functionality), a first signal indicative of a first logic value in accordance with a rising edge of a first clock signal communicated via a second terminal of the host device 720. The loopback channel reception component 730 may be configured as or otherwise support a means for receiving, via a third terminal of the host device 720 (e.g., as part of the loopback operation, in accordance with the loopback functionality), a second signal indicative of a second logic value in accordance with a falling edge of a second clock signal communicated via a fourth terminal of the host device 720.

The channel evaluation component 735 may be configured as or otherwise support a means for performing an operation of the host device 720 based at least in part on comparing the second logic value with the first logic value. For example, if the second logic value differs from first logic value, the method may include changing a reference voltage for an input data buffer, or changing transmitter parameters (e.g., of an output driver of the host device), among other operations.

In some examples, the clock generation component 740 may be configured as or otherwise support a means for generating the first clock signal for output via the second terminal of the host device 720. In some examples, the clock reception component 745 may be configured as or otherwise support a means for receiving the second clock signal via the fourth terminal of the host device 720 based at least in part on outputting the first clock signal.

In some examples, the clock generation component 740 may be configured as or otherwise support a means for generating a third clock signal for output via a fifth terminal of the host device 720. In some examples, the clock reception component 745 may be configured as or otherwise support a means for receiving the second clock signal via the fourth terminal of the host device 720 based at least in part on outputting the first clock signal and the third clock signal.

In some examples, the first clock signal and the third clock signal may be associated with a multi-phase clock having a plurality of rising edges for each rising edge of the second clock signal.

In some examples, the loopback configuration transmission component 750 may be configured as or otherwise support a means for transmitting an indication of a phase of the multi-phase clock, and receiving the second signal indicative of the second logic value may be based at least in part on the indication of the phase of the multi-phase clock.

In some examples, the loopback configuration transmission component 750 may be configured as or otherwise support a means for transmitting an indication of a phase of the multi-phase clock, and the second clock signal may be based at least in part on the indication of the phase of the multi-phase clock.

In some examples, the first clock signal and the third clock signal may each be associated with a first frequency and the second clock signal may be associated with a second frequency that is less than the first frequency.

In some examples, the falling edge of the second clock signal may be a first (e.g., earliest) falling edge of the second clock signal subsequent to the rising edge of the first clock signal.

Figure 8:
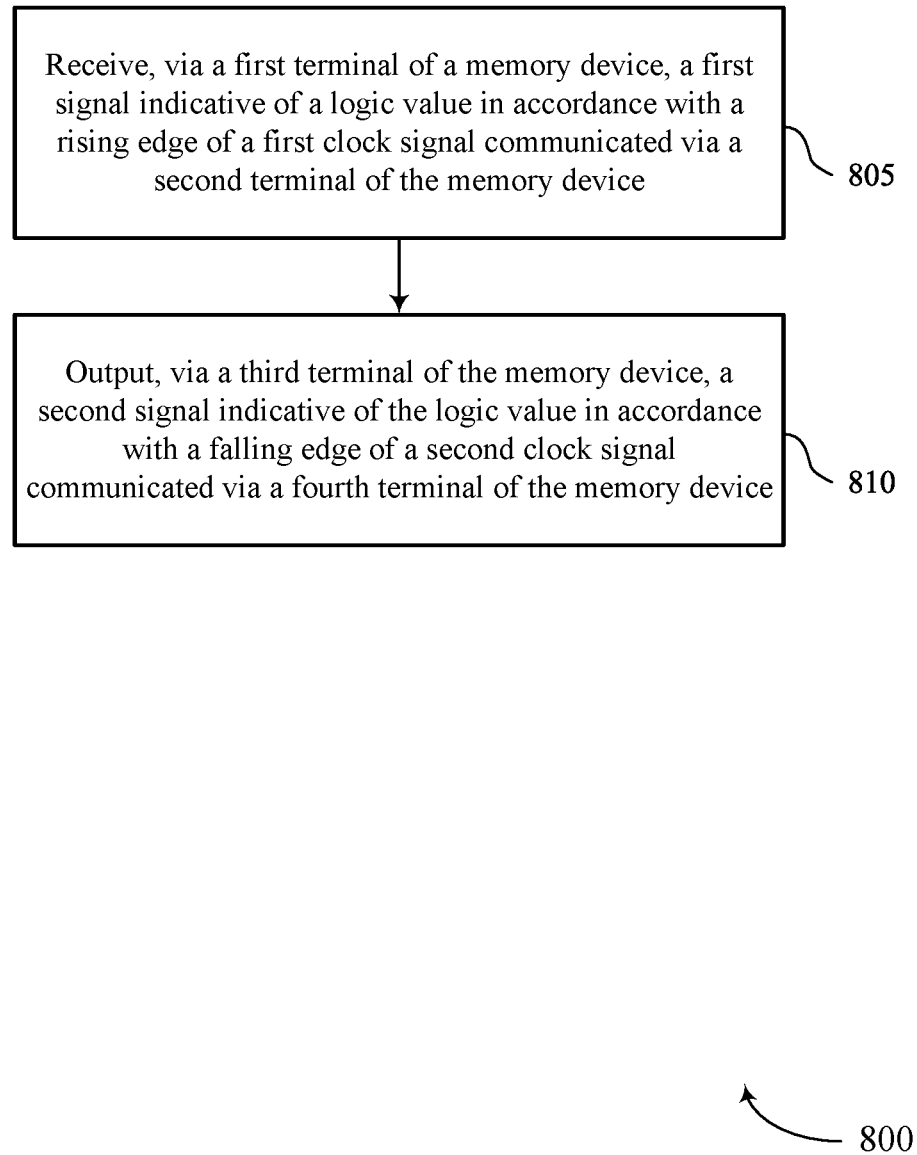
FIGS. 8 and 9 show flowcharts illustrating methods that support output timing for channel loopback of a memory device in accordance with examples as disclosed herein.

FIG. 8 shows a flowchart illustrating a method 800 that supports output timing for channel loopback of a memory device in accordance with examples as disclosed herein. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the device to perform the described functions. Additionally, or alternatively, the memory device may perform aspects of the described functions using special-purpose hardware.

At 805, the method may include receiving, via a first terminal of a memory device (e.g., as part of a loopback operation, in accordance with a loopback functionality), a first signal indicative of a logic value in accordance with a rising edge of a first clock signal communicated via a second terminal of the memory device. The operations of 805 may be performed in accordance with examples as disclosed with reference to FIGS. 3 through 5. In some examples, aspects of the operations of 805 may be performed by a channel reception component 625 as described with reference to FIG. 6.

At 810, the method may include outputting, via a third terminal of the memory device (e.g., as part of the loopback operation, in accordance with the loopback functionality), a second signal indicative of the logic value in accordance with a falling edge of a second clock signal communicated via a fourth terminal of the memory device. The operations of 810 may be performed in accordance with examples as disclosed with reference to FIGS. 3 through 5. In some examples, aspects of the operations of 810 may be performed by a loopback channel transmission component 630 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, via a first terminal of a memory device (e.g., as part of a loopback operation, in accordance with a loopback functionality), a first signal indicative of a logic value in accordance with a rising edge of a first clock signal communicated via a second terminal of the memory device and outputting, via a third terminal of the memory device (e.g., as part of the loopback operation, in accordance with the loopback functionality), a second signal indicative of the logic value in accordance with a falling edge of a second clock signal communicated via a fourth terminal of the memory device.

Aspect 2: The method, apparatus, or non-transitory computer-readable medium of aspect 1, further including operations, features, circuitry, logic, means, or instructions, or any combination thereof for biasing the third terminal with a voltage associated with the logic value for at least a first duration before the falling edge of the second clock signal and at least a second duration after the falling edge of the second clock signal, where outputting the second signal is based at least on biasing the third terminal with the voltage.

Aspect 3: The method, apparatus, or non-transitory computer-readable medium of any of aspects 1 through 2, further including operations, features, circuitry, logic, means, or instructions, or any combination thereof for receiving, at the memory device, the first clock signal via the second terminal of the memory device and generating, at the memory device, the second clock signal for output via the fourth terminal of the memory device based at least in part on the first clock signal.

Aspect 4: The method, apparatus, or non-transitory computer-readable medium of aspect 3, further including operations, features, circuitry, logic, means, or instructions, or any combination thereof for receiving a third clock signal via a fifth terminal of the memory device and generating the second clock signal for output via the fourth terminal of the memory device based at least in part on the first clock signal and the third clock signal.

Aspect 5: The method, apparatus, or non-transitory computer-readable medium of aspect 4 where the first clock signal and the third clock signal are associated with a multi-phase clock having a plurality of rising edges for each rising edge of the second clock signal.

Aspect 6: The method, apparatus, or non-transitory computer-readable medium of aspect 5, further including operations, features, circuitry, logic, means, or instructions, or any combination thereof for receiving, at the memory device, an indication of a phase of the multi-phase clock, where receiving the first signal indicative of the logic value is based at least in part on the indication of the phase of the multi-phase clock.

Aspect 7: The method, apparatus, or non-transitory computer-readable medium of any of aspects 5 through 6, further including operations, features, circuitry, logic, means, or instructions, or any combination thereof for receiving, at the memory device, an indication of a phase of the multi-phase clock, where generating the second clock signal is based at least in part on the indication of the phase of the multi-phase clock.

Aspect 8: The method, apparatus, or non-transitory computer-readable medium of any of aspects 4 through 7 where the first clock signal and the third clock signal are each associated with a first frequency and the second clock signal is associated with a second frequency that is less than the first frequency.

Aspect 9: The method, apparatus, or non-transitory computer-readable medium of any of aspects 1 through 8 where the falling edge of the second clock signal is a first (e.g., earliest) falling edge of the second clock signal subsequent to the rising edge of the first clock signal.

Figure 9:
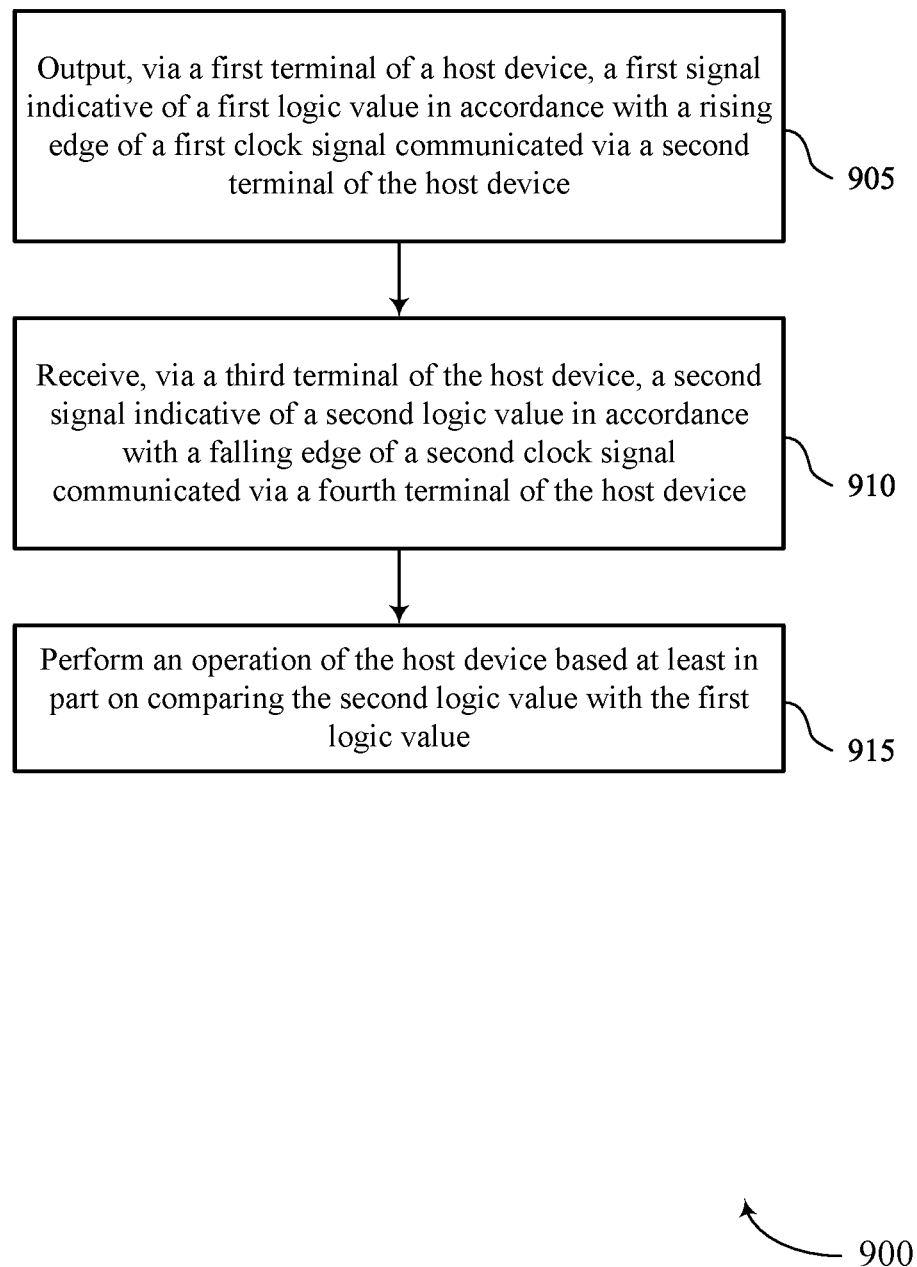

FIG. 9 shows a flowchart illustrating a method 900 that supports output timing for channel loopback of a memory device in accordance with examples as disclosed herein. The operations of method 900 may be implemented by a host device or its components as described herein. For example, the operations of method 900 may be performed by a host device as described with reference to FIGS. 1 through 5 and 7. In some examples, a host device may execute a set of instructions to control the functional elements of the device to perform the described functions. Additionally, or alternatively, the host device may perform aspects of the described functions using special-purpose hardware.

At 905, the method may include outputting, via a first terminal of a host device (e.g., as part of a loopback operation, in accordance with a loopback functionality), a first signal indicative of a first logic value in accordance with a rising edge of a first clock signal communicated via a second terminal of the host device. The operations of 905 may be performed in accordance with examples as disclosed with reference to FIGS. 3 through 5. In some examples, aspects of the operations of 905 may be performed by a channel transmission component 725 as described with reference to FIG. 7.

At 910, the method may include receiving, via a third terminal of the host device (e.g., as part of the loopback operation, in accordance with the loopback functionality), a second signal indicative of a second logic value in accordance with a falling edge of a second clock signal communicated via a fourth terminal of the host device. The operations of 910 may be performed in accordance with examples as disclosed with reference to FIGS. 3 through 5. In some examples, aspects of the operations of 910 may be performed by a loopback channel reception component 730 as described with reference to FIG. 7.

At 915, the method may include performing an operation of the host device based at least in part on comparing the second logic value with the first logic value. For example, if the second logic value differs from first logic value, the method may include the host device changing a reference voltage for an input data buffer, or the host device changing transmitter parameters (e.g., of an output driver of the host device), among other operations. The operations of 915 may be performed in accordance with examples as disclosed with reference to FIGS. 3 through 5. In some examples, aspects of the operations of 915 may be performed by a channel evaluation component 735 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 10: A method, apparatus, or non-transitory computer-readable medium including operations, features, circuitry, logic, means, or instructions, or any combination thereof for outputting, via a first terminal of a host device (e.g., as part of a loopback operation, in accordance with a loopback functionality), a first signal indicative of a first logic value in accordance with a rising edge of a first clock signal communicated via a second terminal of the host device; receiving, via a third terminal of the host device (e.g., as part of the loopback operation, in accordance with the loopback functionality), a second signal indicative of a second logic value in accordance with a falling edge of a second clock signal communicated via a fourth terminal of the host device; and performing an operation of the host device based at least in part on comparing the second logic value with the first logic value.

Aspect 11: The method, apparatus, or non-transitory computer-readable medium of aspect 10, further including operations, features, circuitry, logic, means, or instructions, or any combination thereof for generating, at the host device, the first clock signal for output via the second terminal of the host device and receiving, at the host device, the second clock signal via the fourth terminal of the host device based at least in part on outputting the first clock signal.

Aspect 12: The method, apparatus, or non-transitory computer-readable medium of aspect 11, further including operations, features, circuitry, logic, means, or instructions, or any combination thereof for generating, at the host device, a third clock signal for output via a fifth terminal of the host device and receiving, at the host device, the second clock signal via the fourth terminal of the host device based at least in part on outputting the first clock signal and the third clock signal.

Aspect 13: The method, apparatus, or non-transitory computer-readable medium of aspect 12 where the first clock signal and the third clock signal are associated with a multi-phase clock having a plurality of rising edges for each rising edge of the second clock signal.

Aspect 14: The method, apparatus, or non-transitory computer-readable medium of aspect 13, further including operations, features, circuitry, logic, means, or instructions, or any combination thereof for transmitting an indication of a phase of the multi-phase clock, where receiving the second signal indicative of the second logic value is based at least in part on the indication of the phase of the multi-phase clock.

Aspect 15: The method, apparatus, or non-transitory computer-readable medium of any of aspects 13 through 14, further including operations, features, circuitry, logic, means, or instructions, or any combination thereof for transmitting an indication of a phase of the multi-phase clock, where the second clock signal is based at least in part on the indication of the phase of the multi-phase clock.

Aspect 16: The method, apparatus, or non-transitory computer-readable medium of any of aspects 12 through 15 where the first clock signal and the third clock signal are each associated with a first frequency and the second clock signal is associated with a second frequency that is less than the first frequency.

Aspect 17: The method, apparatus, or non-transitory computer-readable medium of any of aspects 10 through 16 where the falling edge of the second clock signal is a first falling edge of the second clock signal subsequent to the rising edge of the first clock signal.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 18: An apparatus, including: a memory array of a memory device; and logic of the memory device configured to cause the apparatus to: receive, via a first terminal of a memory device (e.g., as part of a loopback operation, in accordance with a loopback functionality), a first signal indicative of a logic value in accordance with a rising edge of a first clock signal communicated via a second terminal of the memory device; and output, via a third terminal of the memory device (e.g., as part of the loopback operation, in accordance with the loopback functionality), a second signal indicative of the logic value in accordance with a falling edge of a second clock signal communicated via a fourth terminal of the memory device.

Aspect 19: The apparatus of aspect 18, where the logic is configured to cause the apparatus to: bias the third terminal with a voltage associated with the logic value for at least a first duration before the falling edge of the second clock signal and at least a second duration after the falling edge of the second clock signal, where outputting the second signal is based at least on biasing the third terminal with the voltage.

Aspect 20: The apparatus of any of aspects 18 through 19, where the logic is configured to cause the apparatus to: receive the first clock signal via the second terminal of the memory device; and generate the second clock signal for output via the fourth terminal of the memory device based at least in part on the first clock signal.

Aspect 21: The apparatus of aspect 20, where the logic is configured to cause the apparatus to: receive a third clock signal via a fifth terminal of the memory device; and generate the second clock signal for output via the fourth terminal of the memory device based at least in part on the third clock signal.

Aspect 22: The apparatus of aspect 21, where the first clock signal and the third clock signal are associated with a multi-phase clock having a plurality of rising edges for each rising edge of the second clock signal.

Aspect 23: The apparatus of aspect 22, where the logic is configured to cause the apparatus to: receive an indication of a phase of the multi-phase clock, where receiving the first signal indicative of the logic value is based at least in part on the indication of the phase of the multi-phase clock.

Aspect 24: The apparatus of any of aspects 22 through 23, where the logic is configured to cause the apparatus to: receive an indication of a phase of the multi-phase clock, where generating the second clock signal is based at least in part on the indication of the phase of the multi-phase clock.

Aspect 25: The apparatus of any of aspects 21 through 24, where the first clock signal and the third clock signal are each associated with a first frequency and the second clock signal is associated with a second frequency that is less than the first frequency.

Aspect 26: The apparatus of any of aspects 18 through 25, where the falling edge of the second clock signal is a first (e.g., earliest) falling edge of the second clock signal subsequent to the rising edge of the first clock signal.

Another apparatus is described. The following provides an overview of aspects of the apparatus as described herein:

Aspect 27: An apparatus, including: logic operable to couple with a memory device, where the logic is configured to cause the apparatus to: output, via a first terminal of the apparatus (e.g., as part of a loopback operation, in accordance with a loopback functionality), a first signal indicative of a first logic value in accordance with a rising edge of a first clock signal communicated via a second terminal of the apparatus; receive, via a third terminal of the apparatus (e.g., as part of the loopback operation, in accordance with the loopback functionality), a second signal indicative of a second logic value in accordance with a falling edge of a second clock signal communicated via a fourth terminal of the apparatus; and performing an operation of the apparatus based at least in part on comparing the second logic value with the first logic value.

Aspect 28: The apparatus of aspect 27, where the logic is configured to cause the apparatus to: generate the first clock signal for output via the second terminal of the apparatus; and receive the second clock signal via the fourth terminal of the apparatus based at least in part on outputting the first clock signal.

Aspect 29: The apparatus of aspect 28, where the logic is configured to cause the apparatus to: generate a third clock signal for output via a fifth terminal of the apparatus; and receive the second clock signal via the fourth terminal of the apparatus based at least in part on outputting the first clock signal and the third clock signal.

Aspect 30: The apparatus of aspect 29, where the first clock signal and the third clock signal are associated with a multi-phase clock having a plurality of rising edges for each rising edge of the second clock signal.

Aspect 31: The apparatus of aspect 30, where the logic is configured to cause the apparatus to: transmit an indication of a phase of the multi-phase clock, where receiving the second signal indicative of the second logic value is based at least in part on the indication of the phase of the multi-phase clock.

Aspect 32: The apparatus of any of aspects 30 through 31, where the logic is configured to cause the apparatus to: transmit an indication of a phase of the multi-phase clock, where the second clock signal is based at least in part on the indication of the phase of the multi-phase clock.

Aspect 33: The apparatus of any of aspects 29 through 32, where the first clock signal and the third clock signal are each associated with a first frequency and the second clock signal is associated with a second frequency that is less than the first frequency.

Aspect 34: The apparatus of any of aspects 27 through 33, where the falling edge of the second clock signal is a first falling edge of the second clock signal subsequent to the rising edge of the first clock signal.

Another apparatus is described. The following provides an overview of aspects of the apparatus as described herein:

Aspect 35: An apparatus, including: a first terminal associated with a first channel (e.g., a data channel); a second terminal associated with a first clock channel; a third terminal associated with a second channel (e.g., a loopback channel); a fourth terminal associated with a second clock signal; and logic configured to cause the apparatus to: receive (e.g., as part of a loopback operation, in accordance with a loopback functionality), a first signal indicative of a logic value via the first terminal in accordance with a rising edge of a first clock signal via second terminal; and output (e.g., as part of the loopback operation, in accordance with the loopback functionality), a second signal indicative of the logic value via the third terminal in accordance with a falling edge of a second clock signal via the fourth terminal.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
  receiving, from a host device and via a first terminal of a memory device as part of a loopback operation, a first signal indicative of a series of logic values that are each received in accordance with a rising edge of a first clock signal communicated between the host device and the memory device and via a second terminal of the memory device; and outputting, to the host device and via a third terminal of the memory device as part of the loopback operation, a second signal indicative of the series of logic values that are each outputted in accordance with a falling edge of a second clock signal communicated between the host device and the memory device and via a fourth terminal of the memory device, wherein the second signal indicative of the series of logic values is outputted, to the host device as part of the loopback operation, after receiving the first signal indicative of the series of logic values.

2. The method of claim 1, further comprising:
biasing the third terminal with a voltage associated with the series of logic values for at least a first duration before the falling edge of the second clock signal and at least a second duration after the falling edge of the second clock signal, wherein outputting the second signal is based at least on biasing the third terminal with the voltage.

3. The method of claim 1, further comprising:
receiving, from the host device and at the memory device, the first clock signal via the second terminal of the memory device; and
generating, at the memory device, the second clock signal for output via the fourth terminal of the memory device based at least in part on the first clock signal.

4. The method of claim 1, further comprising:
receiving a third clock signal via a fifth terminal of the memory device; and
generating the second clock signal for output via the fourth terminal of the memory device based at least in part on the first clock signal and the third clock signal.

5. The method of claim 4, wherein the first clock signal and the third clock signal are associated with a multi-phase clock having a plurality of rising edges for each rising edge of the second clock signal.

6. The method of claim 5, further comprising:
receiving, at the memory device, an indication of a phase of the multi-phase clock, wherein receiving the first signal indicative of the series of logic values is based at least in part on the indication of the phase of the multi-phase clock.

7. The method of claim 1, further comprising:
receiving, at the memory device, an indication of a phase of a multi-phase clock having a plurality of rising edges for each rising edge of the second clock signal, wherein the multi-phase clock is based at least in part on the first clock signal, wherein generating the second clock signal is based at least in part on the indication of the phase of the multi-phase clock.

8. The method of claim 4, wherein the first clock signal and the third clock signal are each associated with a first frequency and the second clock signal is associated with a second frequency that is less than the first frequency.

9. The method of claim 1, wherein the falling edge of the second clock signal is a first falling edge of the second clock signal subsequent to the rising edge of the first clock signal.

10. An apparatus, comprising:
a memory array of a memory device; and
logic of the memory device configured to cause the apparatus to:
receive, from a host device and via a first terminal of the memory device as part of a loopback operation, a first signal indicative of a series of logic values that are each received in accordance with a rising edge of a first clock signal communicated between the host device and the memory device and via a second terminal of the memory device; and output, to the host device and via a third terminal of the memory device as part of the loopback operation, a second signal indicative of the series of logic values that are each outputted in accordance with a falling edge of a second clock signal communicated between the host device and the memory device and via a fourth terminal of the memory device, wherein the second signal indicative of the series of logic values is outputted, to the host device as part of the loopback operation, after receiving the first signal indicative of the series of logic values.

11. The apparatus of claim 10, wherein the logic is configured to cause the apparatus to:
bias the third terminal with a voltage associated with the series of logic values for at least a first duration before the falling edge of the second clock signal and at least a second duration after the falling edge of the second clock signal, wherein outputting the second signal is based at least on biasing the third terminal with the voltage.

12. The apparatus of claim 10, wherein the logic is configured to cause the apparatus to:
receive, from the host device, the first clock signal via the second terminal of the memory device; and
generate the second clock signal for output via the fourth terminal of the memory device based at least in part on the first clock signal.

13. The apparatus of claim 10, wherein the logic is configured to cause the apparatus to:
receive a third clock signal via a fifth terminal of the memory device; and
generate the second clock signal for output via the fourth terminal of the memory device based at least in part on the third clock signal.

14. The apparatus of claim 13, wherein the first clock signal and the third clock signal are associated with a multi-phase clock having a plurality of rising edges for each rising edge of the second clock signal.

15. The apparatus of claim 10, wherein the logic is configured to cause the apparatus to:
receive an indication of a phase of a multi-phase clock having a plurality of rising edges for each rising edge of the second clock signal, wherein the multi-phase clock is based at least in part on the first clock signal, wherein receiving the first signal indicative of the series of logic values is based at least in part on the indication of the phase of the multi-phase clock.

16. The apparatus of claim 14, wherein the logic is configured to cause the apparatus to:
receive an indication of a phase of the multi-phase clock, wherein generating the second clock signal is based at least in part on the indication of the phase of the multi-phase clock.

17. The apparatus of claim 13, wherein the first clock signal and the third clock signal are each associated with a first frequency and the second clock signal is associated with a second frequency that is less than the first frequency.

18. The apparatus of claim 10, wherein the falling edge of the second clock signal is a first falling edge of the second clock signal subsequent to the rising edge of the first clock signal.

19. An apparatus, comprising:
- a first terminal associated with a first channel;
- a second terminal associated with a first clock channel;
- a third terminal associated with a second channel;
- a fourth terminal associated with a second clock channel; and
- logic configured to cause the apparatus to:
- receive, from a host device and as part of a loopback operation, a first signal indicative of a series of logic values via the first terminal that are each received in accordance with a rising edge of a first clock signal via the second terminal; and
- output, to the host device and as part of the loopback operation, a second signal indicative of the series of logic values via the third terminal that are each outputted in accordance with a falling edge of a second clock signal via the fourth terminal, wherein the second signal indicative of the series of logic values is outputted, to the host device as part of the loopback operation, after receiving the first signal indicative of the series of logic values.

20. The apparatus of claim 19, wherein the logic is configured to cause the apparatus to:
- generate the second clock signal for output via the fourth terminal based at least in part on the first clock signal received via the second terminal.

* * * * *